(12) United States Patent
Wu et al.

(10) Patent No.: US 10,778,400 B2
(45) Date of Patent: Sep. 15, 2020

(54) DETERMINATION OF THE TIMING ADVANCE GROUP

(75) Inventors: Chunli Wu, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 737 days.

(21) Appl. No.: 14/233,170

(22) PCT Filed: Jul. 18, 2011

(86) PCT No.: PCT/EP2011/062235
§ 371 (c)(1),
(2), (4) Date: Jan. 16, 2014

(87) PCT Pub. No.: WO2013/010576
PCT Pub. Date: Jan. 24, 2013

(65) Prior Publication Data
US 2014/0185595 A1    Jul. 3, 2014

(51) Int. Cl.
*H04J 3/00* (2006.01)
*H04L 5/00* (2006.01)
(Continued)

(52) U.S. Cl.
CPC ............ *H04L 5/0078* (2013.01); *H04L 5/001* (2013.01); *H04L 5/0037* (2013.01); *H04W 56/00* (2013.01);
(Continued)

(58) Field of Classification Search
CPC ......... H04W 72/0446; H04W 72/0413; H04W 72/042; H04W 56/001; H04W 56/0005
(Continued)

(56) References Cited

U.S. PATENT DOCUMENTS

2006/0146779 A1* 7/2006 Lee ...................... H04W 72/005
370/345
2011/0103332 A1* 5/2011 Kuo ............................. 370/329
(Continued)

FOREIGN PATENT DOCUMENTS

CN         102014476 A        4/2011
CN         102014477 A        4/2011
(Continued)

OTHER PUBLICATIONS

3GPP TSG RAN2#74 meeting R2-113214 "Enhancements on MAC procedures to support CA with multiple TA", Barcelona, Spain, May 9-12, 2011 hereinafter 3GPP.*
(Continued)

*Primary Examiner* — Atique Ahmed
(74) *Attorney, Agent, or Firm* — Harrington & Smith

(57) ABSTRACT

A technique, including initiating an access procedure by making from a communication device an uplink transmission on one component carrier of a plurality of component carriers associated with an access node; thereafter receiving at said communication device group information specifying a group of said plurality of component carriers sharing uplink transmission timing information as a group to which said one component carrier belongs; and making from said communication device a further uplink transmission on said one component carrier using uplink transmission timing information for said group specified in said group information.

11 Claims, 5 Drawing Sheets

(51) Int. Cl.
*H04W 56/00* (2009.01)
*H04W 74/00* (2009.01)
*H04W 74/08* (2009.01)

(52) U.S. Cl.
CPC ..... *H04W 56/0045* (2013.01); *H04W 74/006* (2013.01); *H04W 74/0833* (2013.01)

(58) Field of Classification Search
USPC .......................... 370/336, 350, 329; 455/436
See application file for complete search history.

(56) References Cited

U.S. PATENT DOCUMENTS

| | | | |
|---|---|---|---|
| 2011/0170535 A1* | 7/2011 | Wang et al. ................... | 370/350 |
| 2011/0249635 A1* | 10/2011 | Chen ................... | H04W 74/002 370/329 |
| 2011/0275374 A1* | 11/2011 | Narasimha et al. .......... | 455/436 |
| 2012/0008600 A1* | 1/2012 | Marinier et al. .............. | 370/336 |
| 2012/0250520 A1* | 10/2012 | Chen ....................... | H04L 5/001 370/241 |
| 2012/0252520 A1* | 10/2012 | Xu ........................ | H03G 3/3047 455/522 |
| 2012/0257569 A1* | 10/2012 | Jang ...................... | H04W 52/50 370/328 |
| 2012/0257601 A1* | 10/2012 | Kim ........................ | H04L 5/001 370/336 |

FOREIGN PATENT DOCUMENTS

| | | |
|---|---|---|
| CN | 102123475 A | 7/2011 |
| WO | WO 2011/085200 A1 | 7/2011 |

OTHER PUBLICATIONS

3GPP TSG RAN2#74 meeting R2-113214 Barecelina, Spain, May 9-13, 2011 (Year: 2011).*
3GPP TSG-RAN WG2 meeting #68bis, Valencia, Spain, Jan. 18-22, 2010, R2-100423, "Supporting multiple timing advance groups", Qualcomm Inc., 3 pgs.
3GPP TSG-RAN WG2 Meeting #73bis, Shanghai, China, Apr. 11-15, 2011, R2-111897, "Multiple Timing Advance", Nokia Siemens Networks, Nokia Corp., 4 pgs.
3GPP TSG RAN2#74 meeting, Barcelona, Spain, May 9-13, 2011, R2-113214, "Enhancements on MAC procedures to support CA with multiple TA", Intel Corp., 5 pgs.
3GPP TSG RAN2#74 meeting, Barcelona, Spain, May 9-13, 2011, R2-113215, "Configuration of multiple TA in Rel-11 ", Intel Corp., 5 pgs.
3GPP TS 36.321 V10.1.0 (Mar. 2011) "3rd Generation Partnership Project; Technical Specification Group Radio Access Network; Evolved Universal Terrestrial Radio Access (E-UTRA); Medium Access Control (MAC) protocol specification (Release 10)" pp. 1-53; 3rd Generation Partnership Project (3GPP); Mobile Competence Centre; 650, Route des Lucioles; F-06921 Sophia-Antipolis Cedex; France (53 pages).
3GPP; "ETSI TS 136 .00 V10.4.0 (May 2011) Technical Specification; LTE; Evolved Universal Terrestrial Radio Access (E-UTRA) and Evolved Universal Terrestrial Radio Access Network (E-UTRAN); Overall description; Stage 2 (3GPP TS 36.300 version 10.4.0 Release 10)"; Jun. 2011; whole document (208 pages).
Alcatel-Lucent et al.; "Initiating timing alignment for SCell in multiple TA"; R2-113235; TSG-RAN WG2#75, May 9-13, 2011, Barcelona, Spain; whole document (6 pages).

* cited by examiner

DETERMINATION OF THE TIMING ADVANCE GROUP

Controlling the time at which a communication device makes an uplink transmission within a timeslot can assist in compensating for propagation delays and reducing interference with transmissions in adjacent timeslots, and thereby assist in improving quality of service.

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved.

Examples of radio access networks include, in order of their evolution, GSM (Global System for Mobile) EDGE (Enhanced Data for GSM Evolution) Radio Access Networks (GERAN), Universal Terrestrial Radio Access Networks (UTRAN) and evolved UTRAN (E-UTRAN).

In the Long Term Evolution (LTE) System, downlink transmissions are made according to an orthogonal frequency division multiple access (OFDMA) technique, and uplink transmissions are made according to a single carrier frequency division multiple access (SCFDMA) technique. Each transmission is made using a group of orthogonal sub-carriers. Sub-carriers are grouped into units called resource blocks, and a communication device can make or receive transmissions using groups of resource blocks ranging up to a predetermined maximum number of resource blocks within a predetermined frequency block called a component carrier.

A further LTE development provides for carrier aggregation, where two or more component carriers are aggregated in order to support transmission bandwidths wider than that defined by a single component carrier. Capable communication devices can receive or transmit simultaneously on a plurality of component carriers.

One of the plurality of component carriers configured for use by a communication device is selectively used for security, non-access stratum (NAS) mobility and the transmission of the physical uplink control channel (PUCCH), and is known as the primary cell or PCell. The other component carriers configured for use by the communication device are known as secondary cells or SCells.

There is also proposed the possibility to deactivate one or more SCells for uplink transmissions from a communication device until those one of more SCells are required. Deactivation of SCell(s) reduces power consumption at the communication device for the period that the SCell(s) are deactivated. The monitoring activity of the communication device is reduced; the communication device does not perform PDCCH monitoring or make channel quality information (CQI) measurements for deactivated SCell(s). The uplink activity in a deactivated SCell is also stopped; the communication device does not transmit any sounding reference signals (SRS) for deactivated SCell(s).

Timing advance (TA) values/commands are used to control the timing of uplink transmissions within a timeslot with the aim of compensating for propagation delays. It is proposed to support the use of multiple TA values in the case of LTE uplink carrier aggregation, and it is further proposed to divide the plurality of component carriers configured for uplink transmissions from a communication device (serving cells) into groups of component carriers sharing the same respective TA value.

There has been identified the challenge of facilitating the assignment at the access network of a specific component carrier to an appropriate group of component carriers, and communicating the result of the assignment to the communication device for which said specific component carrier is configured.

It is an aim to meet this challenge.

There is hereby provided a method, comprising: initiating an access procedure by making from a communication device an uplink transmission on one component carrier of a plurality of component carriers associated with an access node; thereafter receiving at said communication device group information specifying a group of said plurality of component carriers sharing uplink transmission timing information as a group to which said one component carrier belongs; and making from said communication device a further uplink transmission on said one component carrier using uplink transmission timing information for said group specified in said group information.

In one embodiment, said access procedure is a Random Access Procedure.

In one embodiment, said uplink transmission comprises an access request message, and the method comprises receiving said group information in a response to said access request message.

In one embodiment, said response also specifies uplink timing information for said group specified in said group information.

In one embodiment, said access request message is a Random Access Preamble Message, and said response is a Random Access Response Message.

In one embodiment, the method further comprises initiating said access procedure in response to an order from said access node.

In one embodiment, the method further comprises configuring said uplink transmission on the basis of configuration information detected from one or more transmissions from said access node before initiating said access procedure.

In one embodiment, said configuration information does not specify a group of said plurality of component carriers sharing uplink transmission timing information to which said one component carrier belongs.

In one embodiment, said configuration information specifies a group of said plurality of component carriers sharing common uplink transmission timing information as a group to which said one component carrier belongs; and the method comprises, in the event that the group specified in said configuration information is different to the group specified in said group information, making said further uplink transmission on said one component carrier preferentially using the uplink transmission timing information for said group specified in said group information.

In one embodiment, said configuration information is received in a radio resource control reconfiguration message.

In one embodiment, the method further comprises receiving said group information in a radio resource control reconfiguration message.

In one embodiment, the uplink transmission timing information is timing advance information.

In one embodiment, said one component carrier is a secondary cell for the communication device, and the plurality of component carriers associated with said access node include at least one other component carrier configured for use by the communication device as a primary cell.

There is also hereby provided a method, comprising: receiving at an access node on one component carrier of a plurality of component carriers associated with said access node an uplink transmission from a communication device initiating an access procedure; at least partly on the basis of a measurement of a parameter of said uplink transmission, determining which group of said plurality of component carriers sharing uplink transmission timing information is to include said one component carrier on which said uplink transmission was received; and transmitting the result of said determination from said access node to said communication device.

In one embodiment, said access procedure is a Random Access Procedure.

In one embodiment, said uplink transmission from said communication device comprises an access request message, and the method further comprises transmitting the result of said determination from said access node to said communication device as part of a response to said access request.

In one embodiment, said response also specifies uplink timing information for said determined group.

In one embodiment, said access request message is a Random Access Preamble Message, and said response is a Random Access Response Message.

In one embodiment, the method further comprises transmitting from said access node an order to said communication device to initiate said access procedure.

In one embodiment, the method further comprises transmitting from said access node configuration information for configuring said uplink transmission.

In one embodiment, said configuration information does not specify a group of said plurality of component carriers sharing uplink transmission timing information as a group to which said one component carrier belongs.

In one embodiment, said configuration information specifies a group of said plurality of component carriers sharing common uplink transmission timing information as a group to which said one component carrier belongs, wherein the determined group may be different to the group specified in said configuration information.

In one embodiment, said configuration information is transmitted in a radio resource control reconfiguration message.

In one embodiment, the method further comprises transmitting the result of said determination from said access node to said communication device in a Radio Resource Control Reconfiguration Message.

In one embodiment, the uplink transmission timing information is timing advance information.

In one embodiment, said one component carrier is a secondary cell for the communication device, and the plurality of component carriers associated with said access node include at least one other component carrier configured for use by the communication device as a primary cell.

There is also hereby provided an apparatus comprising: a processor and memory including computer program code, wherein the memory and computer program code are configured to, with the processor, cause the apparatus to: initiate an access procedure by making from a communication device an uplink transmission on one component carrier of a plurality of component carriers associated with an access node; thereafter receive at said communication device group information specifying a group of said plurality of component carriers sharing uplink transmission timing information as a group to which said one component carrier belongs; and make from said communication device a further uplink transmission on said one component carrier using uplink transmission timing information for said group specified in said group information.

In one embodiment, said access procedure is a Random Access Procedure.

In one embodiment, said uplink transmission comprises an access request message, and said memory and computer program code are configured to, with the processor, cause the apparatus to: receive said group information in a response to said access request message.

In one embodiment, said response also specifies uplink timing information for said group specified in said group information.

In one embodiment, said access request message is a Random Access Preamble Message, and said response is a Random Access Response Message.

In one embodiment, said memory and computer program code are configured to, with the processor, cause the apparatus to: initiate said access procedure in response to an order from said access node.

In one embodiment, said memory and computer program code are configured to, with the processor, cause the apparatus to: configure said uplink transmission on the basis of configuration information detected from one or more transmissions from said access node before initiating said access procedure.

In one embodiment, said configuration information does not specify a group of said plurality of component carriers sharing uplink transmission timing information to which said one component carrier belongs.

In one embodiment, said configuration information specifies a group of said plurality of component carriers sharing common uplink transmission timing information as a group to which said one component carrier belongs; and said memory and computer program code are configured to, with the processor, cause the apparatus to: in the event that the group specified in said configuration information is different to the group specified in said group information, make said further uplink transmission on said one component carrier preferentially using the uplink transmission timing information for said group specified in said group information.

In one embodiment, said configuration information is received in a radio resource control reconfiguration message.

In one embodiment, said memory and computer program code are configured to, with the processor, cause the apparatus to: receive said group information in a radio resource control reconfiguration message.

In one embodiment, the uplink transmission timing information is timing advance information.

In one embodiment, said one component carrier is a secondary cell for the communication device, and the plurality of component carriers associated with said access node include at least one other component carrier configured for use by the communication device as a primary cell.

There is also hereby provided user equipment comprising the above-described apparatus.

There is also hereby provided a processor and memory including computer program code, wherein the memory and computer program code are configured to, with the processor, cause the apparatus to: receive at an access node on one component carrier of a plurality of component carriers associated with said access node an uplink transmission from a communication device initiating an access procedure; at least partly on the basis of a measurement of a parameter of said uplink transmission, determine which group of said plurality of component carriers sharing uplink transmission timing information is to include said one component carrier on which said uplink transmission was received; and transmit the result of said determination from said access node to said communication device.

In one embodiment, said access procedure is a Random Access Procedure.

In one embodiment, said uplink transmission from said communication device comprises an access request message, and said memory and computer program code are configured to, with the processor, cause the apparatus to: transmit the result of said determination from said access node to said communication device as part of a response to said access request.

In one embodiment, said response also specifies uplink timing information for said determined group.

In one embodiment, said access request message is a Random Access Preamble Message, and said response is a Random Access Response Message.

In one embodiment, said memory and computer program code are configured to, with the processor, cause the apparatus to: transmit from said access node an order to said communication device to initiate said access procedure.

In one embodiment, said memory and computer program code are configured to, with the processor, cause the apparatus to: transmit from said access node configuration information for configuring said uplink transmission.

In one embodiment, said configuration information does not specify a group of said plurality of component carriers sharing uplink transmission timing information as a group to which said one component carrier belongs.

In one embodiment, said configuration information specifies a group of said plurality of component carriers sharing common uplink transmission timing information as a group to which said one component carrier belongs, wherein the determined group may be different to the group specified in said configuration information.

In one embodiment, said configuration information is transmitted in a radio resource control reconfiguration message.

In one embodiment, said memory and computer program code are configured to, with the processor, cause the apparatus to: transmit the result of said determination from said access node to said communication device in a Radio Resource Control Reconfiguration Message.

In one embodiment, the uplink transmission timing information is timing advance information.

In one embodiment, said one component carrier is a secondary cell for the communication device, and the plurality of component carriers associated with said access node include at least one other component carrier configured for use by the communication device as a primary cell.

There is also hereby provided an access node comprising the above-described apparatus.

In one embodiment, the access node comprises a macro eNodeB having a plurality of collocated receivers.

There is also hereby provided a computer program product comprising program code means which when loaded into a computer controls the computer to: initiate an access procedure by making from a communication device an uplink transmission on one component carrier of a plurality of component carriers associated with an access node; thereafter receive at said communication device group information specifying a group of said plurality of component carriers sharing uplink transmission timing information as a group to which said one component carrier belongs; and make from said communication device a further uplink transmission on said one component carrier using uplink transmission timing information for said group specified in said group information.

There is also hereby provided a computer program product comprising program code means which when loaded into a computer controls the computer to: receive at an access node on one component carrier of a plurality of component carriers associated with said access node an uplink transmission from a communication device initiating an access procedure; at least partly on the basis of a measurement of a parameter of said uplink transmission, determine which group of said plurality of component carriers sharing uplink transmission timing information is to include said one component carrier on which said uplink transmission was received; and transmit the result of said determination from said access node to said communication device.

Hereunder is provided, by way of example only, a detailed description of techniques related to the delivery of TA group information to a communication device, with reference to the accompany drawings, in which.

The following description relates to the example of a communication system including a radio access network operating in accordance with Long Term Evolution (LTE) Release 10 or beyond.

Figure 1:
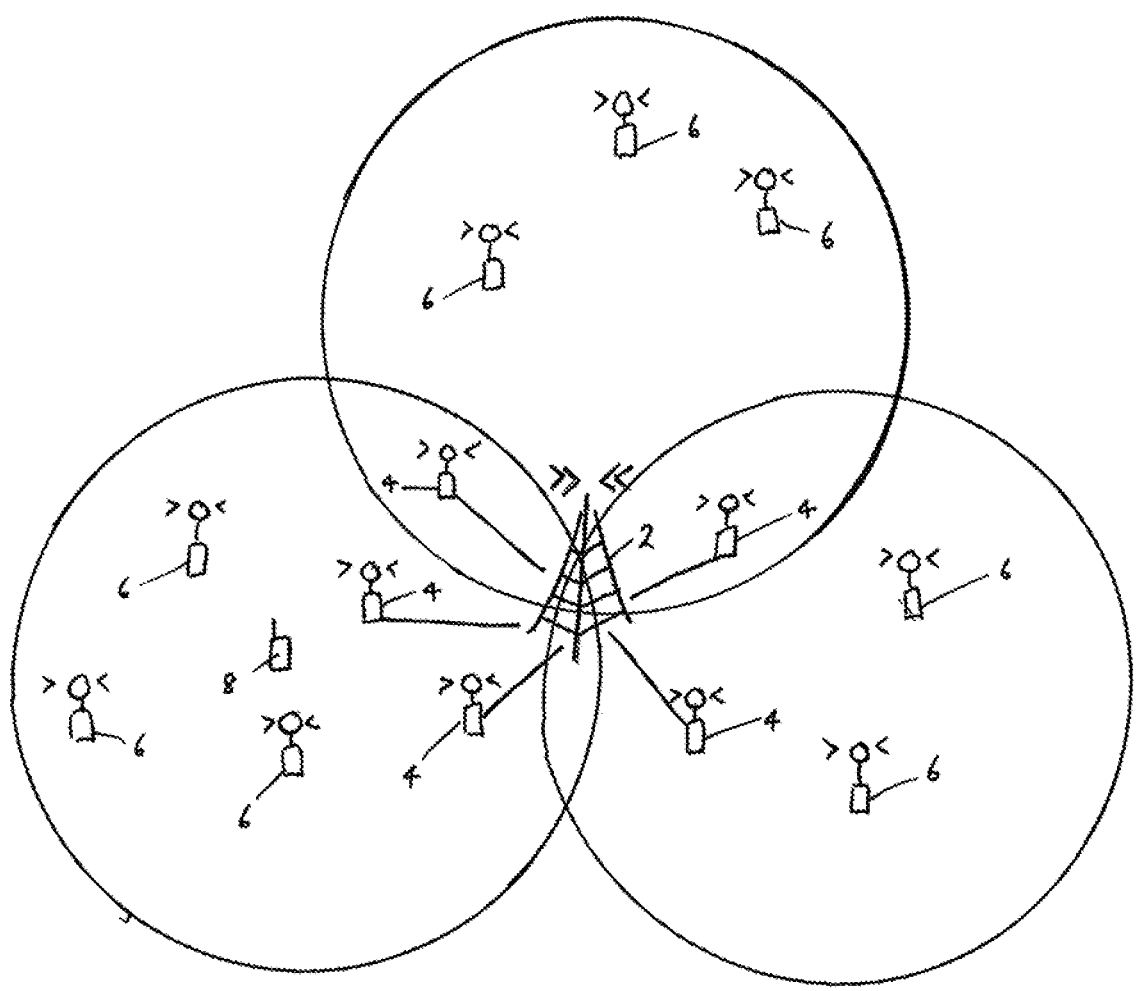
FIG. 1 illustrates the coverage of a single macro eNodeB (eNB) in a cellular radio access network using remote radio heads and frequency selective repeaters as non-collocated receivers.

FIG. 1 illustrates an example of the coverage of a single macro eNB 2 (of a cellular E-UTRAN) deploying non-collocated receivers such as, for example, remote radio heads (RRHs) 4 and frequency selective repeaters 6.

A large cellular radio access network can employ tens of thousands of macro eNBs 2.

Figure 2:
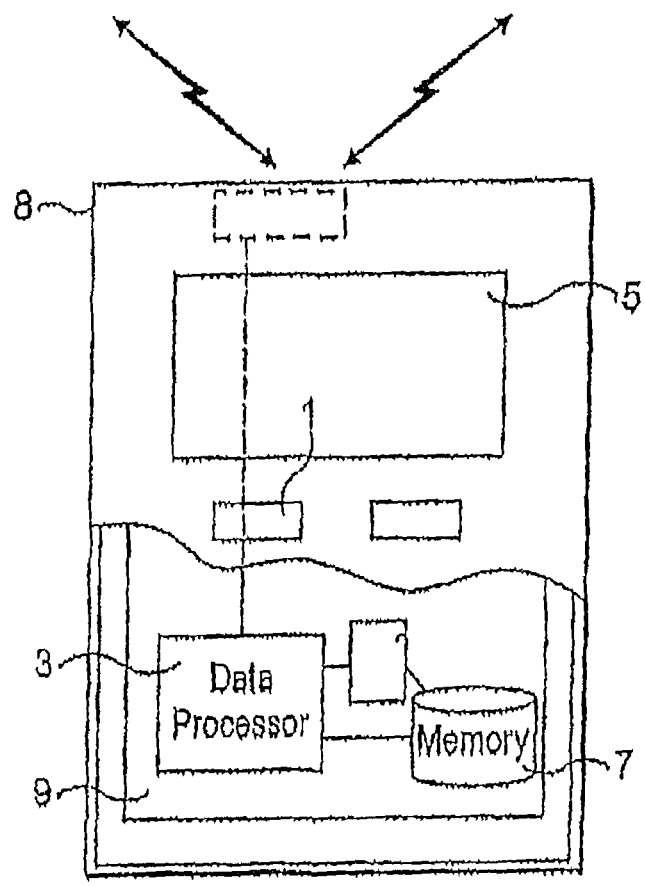
FIG. 2 illustrates some components of one example of user equipment as shown in FIG. 1.

FIG. 2 illustrates some components of one example of user equipment 8 as shown in FIG. 1. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 7 and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE 8 may comprise appropriate connectors (either wired or wireless) to other devices and/or for connecting external accessories, for example hands-free equipment, thereto.

Figure 3:
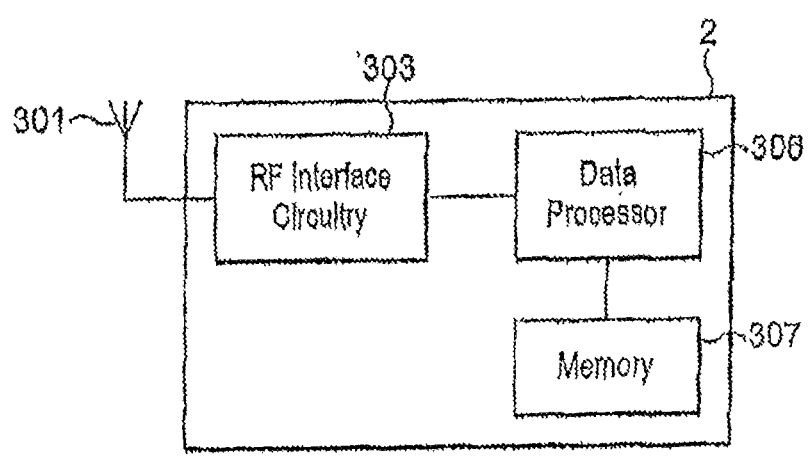
FIG. 3 illustrates some components of an example of an apparatus suitable for the macro eNB, remote radio heads and frequency selective repeaters shown in FIG. 1.

FIG. 3 illustrates some components of an example of an apparatus suitable for the macro eNB 2, remote radio heads 4 and frequency selective repeaters 6 shown in FIG. 1. The apparatus may comprise a radio frequency antenna 301 configured to receive and transmit radio frequency signals, radio frequency interface circuitry 303 configured to interface the radio frequency signals received and transmitted by the antenna 301. The radio frequency interface circuitry may also be known as a transceiver. The apparatus may also comprise a data processor 306 configured to process signals from the radio frequency interface circuitry 303, control the radio frequency interface circuitry 303 to generate suitable RF signals. The access node may further comprise a memory 307 for storing data, parameters and instructions for use by the data processor 306.

It will be understood that the apparatuses shown in FIGS. 2 and 3 respectively and described above may comprise further elements which are not directly involved with the embodiments described hereafter.

The remote radio heads 4 and frequency selective repeaters can be considered as an extension of the macro eNB 2. For uplink transmissions, their receivers and the receivers located at macro eNB 2 function together as a set of non-collocated receivers belonging to macro eNB 2; and the UE 8 sees any downlink transmission from any one of these remote radio heads and frequency selective repeaters as a downlink transmission from macro eNB 2. For the purposes of the following description of embodiments of the invention, a reference to a transmission to or from macro eNB 2 includes a transmission via a remote radio head 4 of frequency selective repeater associated with macro eNB 2, unless otherwise explicitly specified.

The remote radio heads 4 are connected to the macro eNB 2 via a fixed line, and the frequency selective repeaters are connected to the macro eNB 2 via a wireless interface.

Remote radio heads 4 and frequency selective repeaters 6 can be used to improve throughput at hotspots, and/or extend coverage of the macro eNB 2 to areas out of direct reach of the macro eNB 2.

The reception from UE 8 of uplink transmissions at this set of non-collocated receivers associated with macro eNB 2 can involve the aggregation of component carriers of the kind describe above. Assigning each of the component carriers configured for uplink transmissions from UE 8 to one of a plurality of component carrier groups each sharing respective common TA values, and making uplink transmissions on a component carrier according to the TA value for the component carrier group to which said component carrier belongs can improve quality of service.

Figure 4:
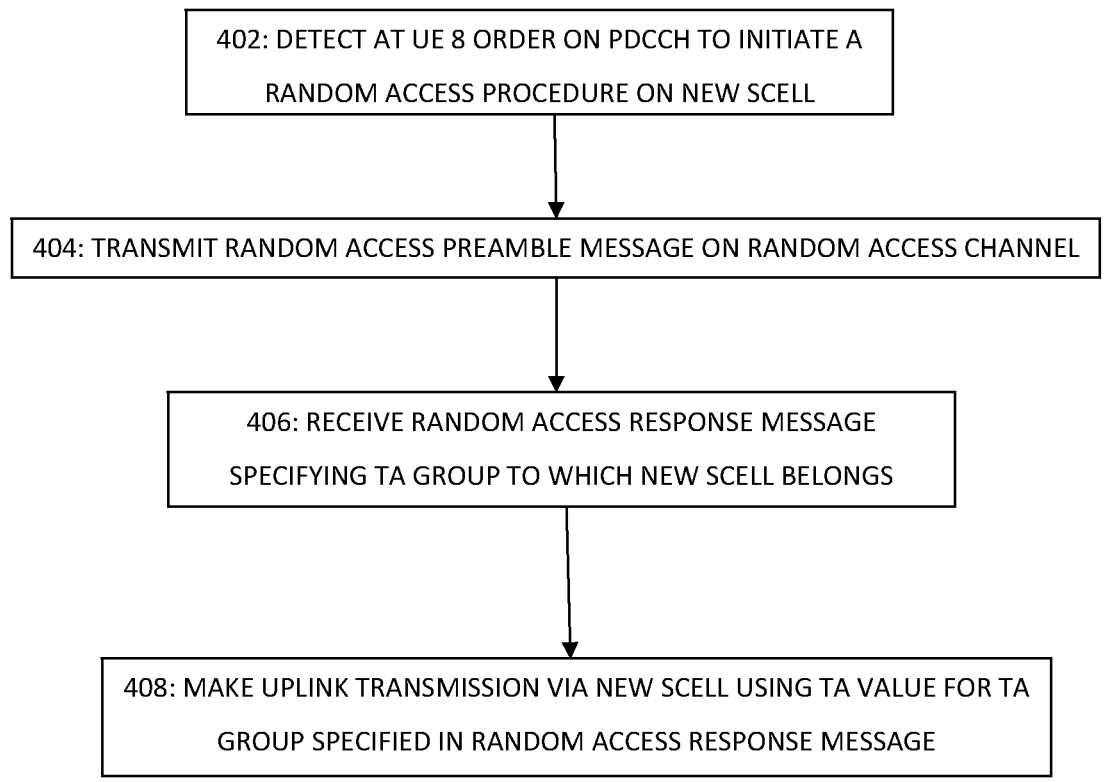
FIG. 4 illustrates one example of operations carried out at user equipment of FIG. 1 in accordance with an embodiment of the present invention.
Figure 5:
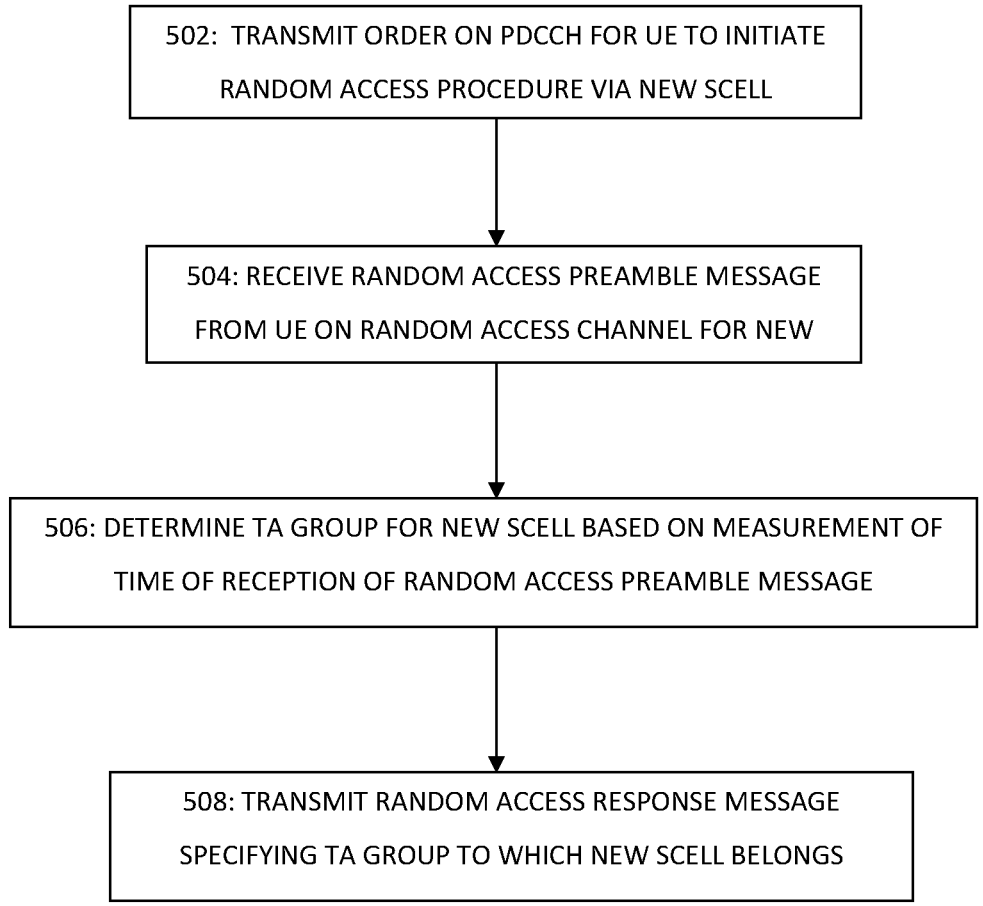
FIG. 5 illustrates one example of operations carried out at the macro eNB of FIG. 1 in accordance with an embodiment of the present invention.

With reference also to FIGS. 4 and 5, hereunder is described an example of a technique according to an embodiment of the present invention for providing UE 8 with information about which group of component carriers a specific component carrier belongs to. The example is set in the context of a component carrier (SCell) having been added to the set of component carriers configured for uplink transmissions from UE 8.

As part of dedicated RRC signalling, macro eNB 2 sends configuration information for a component carrier added to the set of component carriers configured for uplink transmissions from UE 8 ("added SCell"). This configuration information may or may not include information about the Random Access Channel (RACH) for the added SCell (i.e. information about the resources via which a random access request can be made via the added SCell), and may or may not specify a provisional TA Group for the added SCell.

Macro eNB 2 transmits via the physical downlink control channel (PDCCH) an order for UE 8 to initiate a random access procedure of the kind specified in 3GPP TS 36.321 via added Scell (STEP 502 of FIG. 5). UE 8 detects this order from the PDCCH (STEP 502 of FIG. 5). In response to the detection of this order from macro eNB 2, UE 8 sends a Random Access Preamble Message via the RACH for the added SCell (STEP 404 of FIG. 4). The Random Access Preamble Message includes a header indicating a random identifier (Random Access Preamble Identifier (RAPID)) for the UE 8. If macro eNB 2 receives this Preamble Message correctly (STEP 504 of FIG. 5), macro eNB 2 sends a Random Access Response Message to UE 8 at a time and location on the Physical Downlink Shared Channel (PDSCH) scheduled by PDCCH addressed to a Random Access—Radio Network Temporary Identifier (RA-RNTI) that can be calculated by UE 8 from the time and location the Random Access Preamble Message was sent (STEP 508 of FIG. 5). Macro eNB 2 is able to determine from a measurement of the time of reception of the Random Access Preamble Message which group of component carriers the added SCell should belong to in terms of TA value (which groups we shall hereafter refer to as TA groups) (STEP 506 of FIG. 5), and macro eNB 2 includes an indication of the selected TA group in the Random Access Response Message. The Random Access Response (RAR) Message also specifies in the header thereof the random identifier indicated in the Random Access Preamble Message (RAPID).

The RAR Message may also indicate in the payload thereof (i) a Cell Radio Network Temporary ID (Temporary C-RNTI) which is used for further uplink transmissions via the added SCell, and (ii) an indication of the uplink resources scheduled for the next uplink transmission from UE 8 via the added SCell (UL Grant). UE 8 receives the RAR Message at the expected time (STEP 406 of FIG. 4) subsequently makes a further uplink transmission using the TA value for the TA group specified in the RAR Message (STEP 408 of FIG. 4).

Where the random access procedure is for a secondary cell (SCell) (as in the example described above) and not a primary cell (PCell), (i) the RAR message does not need to indicate a Temporary C-RNTI for the UE since the UE will already know the C-RNTI (as described later, the bits of the RAR Message that would be used for indicating Temporary C-RNTI can be used instead to indicate TA Group Information for the SCell); and (ii) UL grant can also be omitted from the RAR Message since no msg3 transmission is needed from UE 8 in reply to the RAR Message.

Also, the RAPID in the header of the RAR Message is the ID corresponding to the preamble transmitted from the UE, i.e. the preamble indicated in the above-mentioned PDCCH order from macro eNB 2, if dedicated preamble is provided.

One possible alternative is to include the TA Group Information in an RRC reconfiguration message sent from macro eNB 2 to UE 8 as soon as possible after completion of the Random Access Random Access procedure.

As mentioned above, the configuration information for the added SCell sent by macro eNB 2 before UE 8 sends the Random Access Preamble Message may or may not include RACH parameters for the added Scell; and may or may not include information about the TA group for the added SCell.

It may be that the SCell (re)configuration information sent by macro eNB does not ever include any TA Group information. If the configuration information sent by the macro eNB 2 as part of the RRC signalling does not include RACH parameters for the added SCell, UE 8 adopts a default configuration of applying the TA value it uses for uplink transmissions via the PCell. If the configuration information sent by the macro eNB 2 as part of the RRC signalling does include RACH parameters for the added SCell, UE 8 determines that no TA group is yet configured for the added SCell, and determines that it cannot apply the TA of an existing TA group to the added SCell, the UE 8 does not adopt this default configuration for the Random Access Preamble Message, and instead aligns the uplink timing for preamble transmission with the downlink timing.

Alternatively, the configuration information sent by macro eNB 2 as RRC signalling can optionally include TA group information, where the macro eNB 2 cannot identify the TA group to which the added SCell belongs. Where the RRC signalling does indicate a TA group for the added SCell, UE 8 applies the TA value for the indicated TA group to the transmission of the Random Access Preamble Message. Where TA group information for the added SCell is not included because the macro eNB 2 cannot identify the TA group to which the added SCell belongs, UE 8 determines that no TA group is yet configured for the added SCell, and determines that it cannot apply the TA for any existing TA group to the added SCell. UE 8 instead aligns the uplink timing for preamble transmission with the downlink timing.

According to another alternative, the configuration information sent by the macro eNB for the added SCell must include TA group information for the added SCell. In the event that macro eNB 2 is not able to identify the appropriate TA group for the added SCell, macro eNB 2 can, for example, specify in the RRC signalling the TA group of the PCell or a new group, knowing that it has the possibility of overriding this provisional indication, by specifying a different TA Group in the RAR Message that it sends to UE 8 upon correctly receiving a Random Access Preamble Message from the UE 8 via the added SCell, as described above.

As mentioned above, where the RRC signalling sent by macro eNB 2 neither includes RACH parameters nor TA group information for the added SCell, UE 8 applies the same TA as PCell and assumes that there is only one TA group (or rather that there are no TA groups). This ensures backward compatibility with eNBs of earlier LTE releases.

The TA Group specified in the RAR Message for the added SCell may not necessarily be a TA Group including another of the component carriers configured for uplink transmissions from UE 8. In this event, the RAR Message also specifies a TA value for the TA Group for the added SCell. Where the TA Group for the added SCell does include another activated component carrier for UE 8, the RAR Message may or may not specify the TA value for the TA Group; UE 8 will already know the TA value for this TA Group in relation to one or more other component carriers configured for the UE and belonging to the same TA Group.

Figure 6:
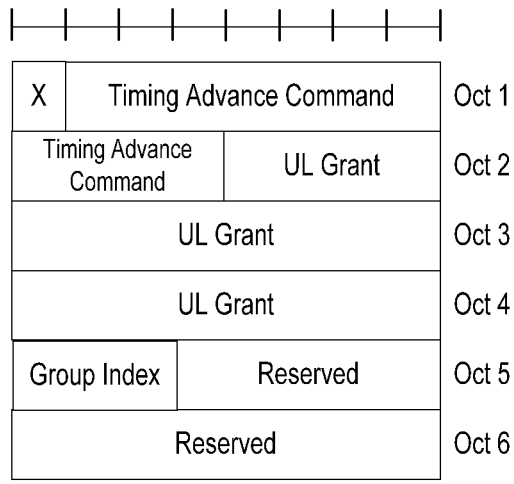
FIGS. 6 to 8 illustrate examples of information elements for use in an Random Access Response Message in an embodiment of the present invention.
Figure 7:
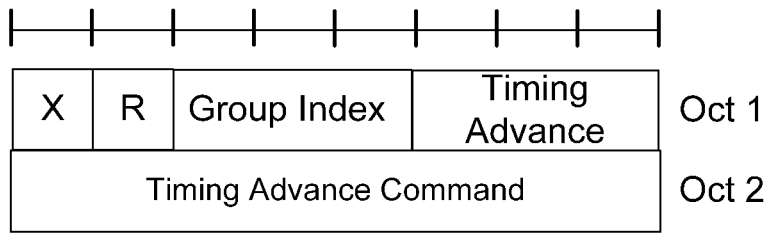
Figure 8:
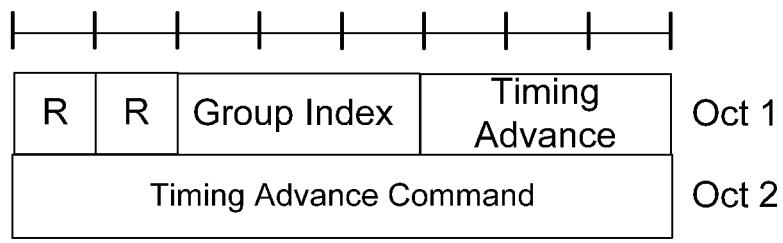

FIGS. 6 to 8 illustrate examples of information elements for the payload of the RAR Message in the technique described above.

In the example of FIG. 6, the X field (1-bit) indicates the TA group for the added SCell if there are no more than 2 TA Groups. If there are more than 2 TA Groups in total, then the X-field is set to "1" to indicate that the information element specifies a TA Group Index for the added S-Cell, and the Group Index field specifies the TA Group for the added SCell. The information element also specifies the TA value (Timing Advance) for the TA Group specified in the Group Index Field.

FIGS. 7 and 8 show examples of a new format for an information element for the payload of a RAR Message without UL Grant. Either the new information element includes an X field set to "1" (FIG. 7) to indicate the information element follows the new format or such an explicit indication can be omitted (FIG. 8) where UE 8 would implicitly expect this new format upon detecting the absence of TA Group information in the dedicated RRC signalling specifying RACH configuration parameters.

In all of the examples of FIGS. 6 to 8, the information element omits any indication of the Temporary C-RNTI for UE 8. As mentioned above, an indication of the Temporary C-RNTI in the RAR Message is not necessary in the example of the technique described above, where the random access procedure is for a SCell and not a PCell. The bits/resources that might otherwise be used to indicate the C-RNTI for the UE 8 are instead used to indicate TA Group information (Group Index) and the TA value for the specified TA Group (Timing Advance).

Ensuring backward compatibility with eNBs of earlier LTE Releases could be achieved by: for individual RAR Messages adopting this new kind of information element, including the new information element as the last entry in the Medium Access Control Protocol Data Unit (MAC PDU) of the RAR Message.

The above-described technique is of particular use, for example, in a system in which it could be difficult to know the presence and location of the frequency selective repeaters operating under a macro eNB. At the time of adding a SCell to the set of component carriers configured for the uplink transmissions from a communication device, the macro eNB might not always know whether the added SCell belongs to an existing TA Group. With the above-described technique, a communication device is provided with accurate TA Group information at an early stage of the access procedure, even if the macro eNB does not know at the time of adding the SCell to the set of configured component carriers whether the added SCell belongs to an existing TA Group.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described techniques may be made, and that the described techniques have application in other communication systems.

The invention claimed is:

1. A method comprising:
   in response to configuration information in a carrier aggregation not including timing advance group information for a secondary cell and not including random access channel parameters for the secondary cell, applying, prior to sending a random access preamble message as part of a random access procedure for the secondary cell, a primary cell timing advance value to the secondary cell; and
   sending the random access preamble message.
2. The method of claim 1, wherein said configuration information received before sending a random access preamble message from a communication device is received as part of radio resource control signaling.

3. The method of claim 1, further comprising:
   sending said random access preamble message;
   receiving group information specifying timing advance group information for said secondary cell; and
   making a further uplink transmission on said secondary cell using a timing advance value for the timing advance group specified in said timing advance group information.
4. The method of claim 3, further comprising:
   receiving said timing advance group information in a random access response message.
5. The method of claim 2, further comprising:
   sending said random access preamble message in response to an order from an access node.
6. An apparatus comprising:
   at least one processor and at least one memory including a non-transitory computer program code, wherein the at least one memory and the non-transitory computer program code are configured, with the at least one processor, to cause the apparatus to at least perform the following:
   in response to configuration information in a carrier aggregation not including timing advance group information for a secondary cell and not including random access channel parameters for the secondary cell, applying, prior to sending a random access preamble message as part of a random access procedure for the secondary cell, a primary cell timing advance value to the secondary cell; and
   sending the random access preamble message.
7. The apparatus of claim 6, wherein said configuration information received before sending a random access preamble message from the communication device is received as part of radio resource control signaling.
8. The apparatus of claim 6, wherein the at least one memory and the non-transitory computer program code are further configured, with the at least one processor, to cause the apparatus to at least perform the following:
   sending said random access preamble message;
   receiving group information specifying timing advance group information for said secondary cell; and
   making a further uplink transmission on said secondary cell using a timing advance value for the timing advance group specified in said timing advance group information.
9. The apparatus of claim 8, wherein said timing advance group information is included in a random access response message.
10. The apparatus of claim 7, wherein said random access preamble message is sent in response to an order from an access node.
11. A computer program product embodied on a non-transitory computer-readable medium in which a computer program is stored that, when being executed by a computer, is configured to provide instructions to control or carry out:
   in response to configuration information in a carrier aggregation not including timing advance group information for a secondary cell and not including random access channel parameters for the secondary cell, applying, prior to sending a random access preamble message as part of a random access procedure for the secondary cell, a primary cell timing advance value to the secondary cell;
   and sending the random access preamble message.

* * * * *